United States Patent
Wang et al.

(10) Patent No.: US 12,259,992 B2
(45) Date of Patent: Mar. 25, 2025

(54) CENTRALIZED ACCESS CONTROL FOR CLOUD RELATIONAL DATABASE MANAGEMENT SYSTEM RESOURCES

(71) Applicant: Microsoft Technology Licensing, LLC, Redmond, WA (US)

(72) Inventors: Yueren Wang, Redmond, WA (US); Elnata Degefa, Sammamish, WA (US); Andreas Wolter, Redmond, WA (US); Steven Richard Gott, Bellevue, WA (US); Nitish Gupta, Seattle, WA (US); Raghav Kaushik, Kirkland, WA (US); Rakesh Khanduja, Bangalore (IN); Shafi Ahmad, Bangalore (IN); Dilli Dorai Minnal Arumugam, Campbell, CA (US); Pankaj Prabhakar Naik, Redmond, WA (US); Nikolas Christopher Ogg, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 18/428,402

(22) Filed: Jan. 31, 2024

(65) Prior Publication Data

US 2024/0241980 A1 Jul. 18, 2024

Related U.S. Application Data

(63) Continuation of application No. 17/401,165, filed on Aug. 12, 2021, now Pat. No. 11,934,548.

(30) Foreign Application Priority Data

May 27, 2021 (IN) .............................. 202141023721

(51) Int. Cl.
*G06F 16/95* (2019.01)
*G06F 12/0875* (2016.01)
(Continued)

(52) U.S. Cl.
CPC ...... *G06F 21/6218* (2013.01); *G06F 12/0875* (2013.01); *G06F 15/17331* (2013.01); *G06F 16/9574* (2019.01); *G06F 2212/45* (2013.01)

(58) Field of Classification Search
None
See application file for complete search history.

(56) References Cited

U.S. PATENT DOCUMENTS

| 5,185,878 | A | * | 2/1993 | Baror | .................. | G06F 12/0848 |
| | | | | | | 711/146 |
| 5,627,992 | A | * | 5/1997 | Baror | .................. | G06F 12/0837 |
| | | | | | | 711/134 |

(Continued)

*Primary Examiner* — Eliyah S. Harper
(74) *Attorney, Agent, or Firm* — Weaver IP L.L.C.

(57) ABSTRACT

Methods for centralized access control for cloud relational database management system resources are performed by systems and devices. The methods utilize a central policy storage, managed externally to database servers, which stores external policies for access to internal database resources at up to fine granularity. Database servers in the processing system each receive external access policies that correspond to users of the system by push or pull operations from the central policy storage, and store the external access policies in a cache of the database servers for databases. For resource access, access conditions are determined via policy engines of database servers based on an external access policy in the cache that corresponds to a user, responsive to a resource access request from a device of the user specifying the internal resource. Data associated with the resource is provided to the user based on the access condition being met.

20 Claims, 6 Drawing Sheets

(51) Int. Cl.
    *G06F 15/173*     (2006.01)
    *G06F 16/957*     (2019.01)
    *G06F 21/62*     (2013.01)

(56) References Cited

U.S. PATENT DOCUMENTS

| | | | | |
|---|---|---|---|---|
| 8,032,409 | B1* | 10/2011 | Mikurak | G06Q 30/00 |
| | | | | 705/14.39 |
| 9,294,608 | B2* | 3/2016 | Donahue | H04L 67/04 |
| 9,319,469 | B2* | 4/2016 | Ruhlen | H04L 67/1001 |
| 9,602,539 | B1* | 3/2017 | Bharali | G06F 21/6218 |
| 2004/0010612 | A1* | 1/2004 | Pandya | H04L 9/40 |
| | | | | 709/213 |
| 2004/0165588 | A1* | 8/2004 | Pandya | H04L 63/0218 |
| | | | | 370/389 |
| 2007/0028110 | A1* | 2/2007 | Brennan | H04L 63/18 |
| | | | | 713/176 |
| 2007/0028291 | A1* | 2/2007 | Brennan | H04L 63/145 |
| | | | | 713/1 |
| 2007/0028303 | A1* | 2/2007 | Brennan | G06F 21/55 |
| | | | | 726/24 |
| 2017/0083339 | A1* | 3/2017 | Burger | G06F 9/30007 |
| 2018/0027006 | A1* | 1/2018 | Zimmermann | H04L 63/0227 |
| | | | | 726/11 |
| 2020/0057664 | A1* | 2/2020 | Durham | G06F 21/53 |
| 2020/0278813 | A1* | 9/2020 | Nilsson | G06F 3/0604 |
| 2020/0356536 | A1* | 11/2020 | Nilsson | G06F 16/122 |
| 2022/0382892 | A1* | 12/2022 | Wang | G06F 15/17331 |
| 2023/0079608 | A1* | 3/2023 | Chen | H04L 9/0891 |
| | | | | 380/277 |

\* cited by examiner

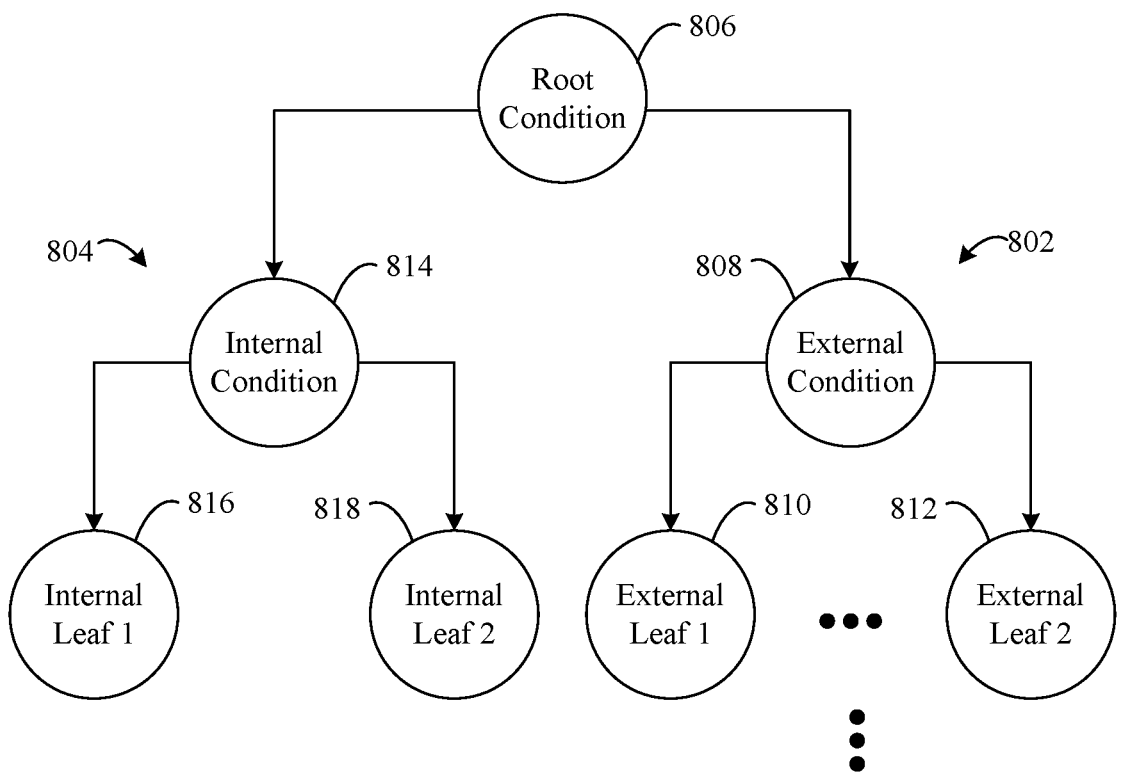

FIG. 8

| |
|---|
| Determine another access condition via the policy engine of one of the database servers, based at least on another one of the external access policies, stored in the cache, which corresponds to another user, responsive to another resource access request received from another device of the other user that specifies the resource or another resource internal to the database server |

| |
|---|
| Deny access of the other device of the other user to the data associated with the resource or to other data associated with the other resource based at least on the access condition being unmet by at least one of the one of the internal access policies or the one of the external access policies indicating a denial of access |

FIG. 9

CENTRALIZED ACCESS CONTROL FOR CLOUD RELATIONAL DATABASE MANAGEMENT SYSTEM RESOURCES

CROSS-REFERENCE TO RELATED APPLICATION(S)

This application claims priority to U.S. non-provisional patent application Ser. No. 17/401,165, filed on Aug. 12, 2021, and entitled "CENTRALIZED ACCESS CONTROL FOR CLOUD RELATIONAL DATABASE MANAGEMENT SYSTEM RESOURCES," which claims priority to Indian Patent Application No. 202141023721, filed on May 27, 2021, and entitled "CENTRALIZED ACCESS CONTROL FOR CLOUD RELATIONAL DATABASE MANAGEMENT SYSTEM RESOURCES," the entireties of which are incorporated by reference herein.

BACKGROUND

Traditional relational database management systems offer access control based on permissions stored locally in the databases. Server-level permissions are stored in a central system database. Those permission can be applied to user accounts which are also stored within the databases. Server level accounts are called "logins," and the creation of users and logins is performed with server-specific tools, and to apply permissions, statements such as "grant," "revoke," or "deny" are utilized. Based on the stored result of these permission-assignments, a database server then decides at run-time if a user is allowed to run a given statement. In the absence of a permission, the operation is not allowed. This solution assumes that customer's database resources are mainly managed on an individual basis like traditionally on-premises implementations. That is, each server and its databases are managed separately from other servers and databases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for centralized access control for cloud relational database management system resources are performed by systems and devices. The methods utilize a central policy storage, managed externally to database servers, which stores external policies for access to internal database resources with granularity from subscription level down to column level accesses. Database servers in the processing system each receive external access policies that correspond to users of the system by push or pull operations from the central policy storage, and store the external access policies in a cache of the database servers for databases. For resource access, access conditions are determined via policy engines of database servers based on an external access policy in the cache that corresponds to a user and when available, an internal access policy, responsive to a resource access request from a device of the user that specifies the internal database resource. Internal and external policies are stored in hierarchical data structures that are traversed during access condition determinations, and an access denial from either of the internal or external policies prevents access. Data associated with the resource is provided to the user based on the access condition being met. External access policies are updated, created, or otherwise modified through a system portal by administrators, and a single external policy, or multiple external policies, per user is utilized for the entire system.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 8 shows a policy data structure diagram for centralized access control for cloud relational database management system resources, in accordance with an example embodiment.

FIG. 9 shows a flowchart for centralized access control for cloud relational database management system resources, in accordance with an example embodiment.

Figure 1A:
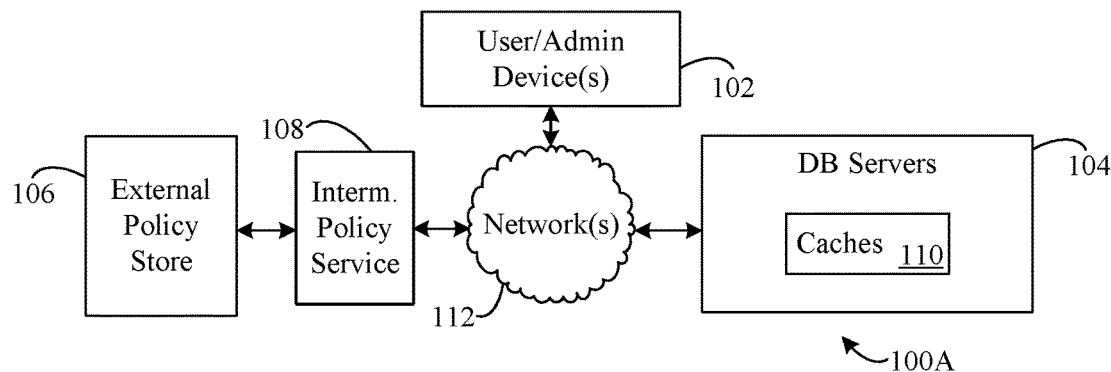
FIG. 1A shows a block diagram of a system for centralized access control for cloud relational database management system resources, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for centralized access control for cloud relational database management system resources. Section III below describes example computing device embodiments that may be used to implement features of the embodiments described herein. Section IV below describes additional examples and advantages, and Section V provides some concluding remarks.

II. Example Embodiments for Centralized Access Control for Cloud Relational Database Management System Resources Methods for centralized access control for cloud relational database management system resources are performed by systems and devices. The methods utilize a central policy storage, managed externally to database servers, which stores external policies for access to internal relational database management system (RDBMS) resources. Database servers in processing systems such as RDBMS systems that may comprise many such servers are configured to each receive external access policies that correspond to users of the system by push or pull operations from the central policy storage, and store the external access policies in a cache of the database servers for databases. The external access policies may include policies/permissions, for resources internal to one or more of the database servers, with permissions granularity from subscription level down to column level accesses, and even to database objects and/or database operator-level permissions. For resource access, access conditions are determined via policy engines of database servers based on the external access policies stored in the caches that correspond to a specific user and when available, an associated internal access policy of the user, responsive to a resource access request from a device of the user that specifies the internal database resource(s). Internal and external policies are stored in hierarchical data structures that are traversed during access condition determinations, and an access denial from either of the internal or external policies prevents access. Likewise, an absence of a permission prevents access. Data associated with the resource is provided to the user based on the access condition being met. In embodiments, the access condition may be met by a grant being indicated while a denial is not indicated. External access policies are updated, created, or otherwise modified through a system portal by administrators, and a single external policy, or multiple external policies, per user is utilized for each database server of the entire system.

Prior solutions that require permissions to be set for users on each individual database server, and even for each database hosted by a given server, assume that a user's or customer's database resources are mainly managed on such an individual basis like traditionally on-premises implementations. That is, in prior solutions, each database server and its respective database(s) is(are) managed separately from other database servers and databases. Such implementations are cumbersome when a user or customer manages large numbers of database servers, e.g., in a cloud-implementation, or adopts and moves their database servers and databases from "box" to cloud.

For instance, prior solutions lack scalability when managing clusters of database server. With advancements of technology, more data created and stored by the user or customer, as well as cheaper cloud database solutions emerging, a user or customer needs to use clusters of database servers to manage its data and corresponding business workflows. These existing database servers can exist across different subscriptions and inside subscriptions within multiple so-called "resource groups," which as traditional on-premises solutions require a user or customer to manage the access control permission for each server separately and individually. This is a time consuming and error-prone process that requires additional compute time for each access as well as additional network overhead for communications of each access. Additionally, customized permission granularity is inhibited in prior solutions, e.g., extending the permission granularity in the traditional server-based access control solutions. For example, current solutions may use permissions to alter event sessions to manage a user's ability to start or stop an event session, but a more granular permission that only allows a user to start an event session or stop an event session is problematic as extending current hierarchical permission systems to a non-hierarchical system introduces breaking changes to existing covering permissions. Moreover, prior solutions lack scalability when managing users. Currently in per-server permissions implementations, a new user who needs access to database servers (or needs permissions to be revoked) requires a server administrator to login and run permission commands on each server, a repeated process which is time consuming and error-prone, and also includes additional processing and power as well as network communications overhead for each change. Finally, traditional solutions have a lack of policy drift control. Current implementations require that each policy is defined in each of the database server instances, and any update on a policy itself requires server admin to update each server accordingly, thus presenting similar issues with system resources, time, and errors as noted above.

Embodiments herein alleviate and/or eliminate the issues discussed above through a unique processing system with centralized access control and maintenance external to database servers that is applicable to any number of database servers in the system. The embodiments described herein include an external access control sub-system for a user or customer to manage the access control policies outside of the database system for access to resources internal to the database servers. Because the system manages the permission policies outside the database servers and hosted database engines, it is possible for a user or customer to create or update a policy without logging into each database server/database itself. Further, the centralized, external storage of permission policies are enabled for sharing by clusters of database server resources, i.e., the permissions being granted or revoked is applied to all database servers, thus there is no need to create permissions at each database server. This provides for the scalability of managing clusters of database servers with improved system efficiency and no policy drift. In addition, policy-assignments can also be evaluated if a specific database to which they apply is in a read-only mode, e.g., that prevents any changes to permissions under traditional models, as is the case for failover-copies that represent a one-to-one copy of the original database. The embodiments herein provide for access control policies generated and/or maintained from outside of database servers, and thus these databases are enabled to receive different resulting permissions than the original databases, which would not be possible in traditional implementations.

Similarly, a new user or customer needs to be added into this centralized, external policy management sub-system only once, and the permission assigned to or revoked from this user or customer can be applied to all database servers sharing the centralized policy store for access control. Simply put, there is no need to add the user or customer to each database server individually, as required in prior implementations. Therefore, the scalability of managing users' or customers' access to database server resources is achieved. When a policy update is required, unlike the traditional approach where each server needs to update its own policy, a simple one-time update of a policy in the centralized, external policy management sub-system is sufficient. The updated record will be populated into each database server, thus simplifying control of policy drift.

Still further, as embodiments provide for the centralized, external policy management sub-system to utilize a hierarchical structure, if there is a requirement or management desire to introduce more granular policies, a simple extension of policy scope and a deployment of the policy to the centralized system is sufficient to enable any scope of granularity. In contrast, prior on-premises implementations lack a policy hierarchy structure, and require much investigation, as well as additional development, testing, and deployment for any additional granularity below the subscription level.

The above-described process may be performed for any number of databases, or other, servers, clusters, etc., in cloud-based implementations spanning many different applications under an infrastructure that utilizes database servers, such as RDBMS implementations, scaled or otherwise configured, while application to on-premise servers is also contemplated herein, according to embodiments.

Accordingly, methods for centralized access control for cloud relational database management system resources are performed by systems and devices. The embodiments herein provide solutions that improve system efficiency and accuracy for access policy modifications and creation, as well as preventing policy drift. Additionally, the embodiments herein improve the process of managing and implementing access policies for database resource through a non-conventional and non-generic arrangement of the centralized, external policy management sub-system with respect to database servers in processing systems. That is, the utilization of an external policy management sub-system at a specific location, centralized and remote from the database servers accessed by end-users, with customizable access policies specific to each end user, provide improvements for the operation and management of database server systems. These and other embodiments for centralized access control for cloud relational database management system resources will be described in further detail below in association with the Figures, and in the Sections/Subsections that follow.

Figure 1B:
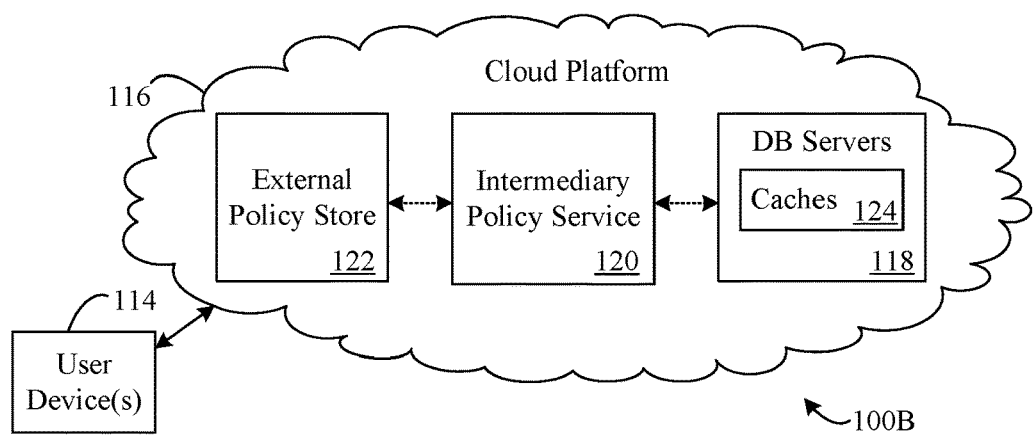
FIG. 1B shows a block diagram of a cloud-based system for centralized access control for cloud relational database management system resources, according to an example embodiment.

Systems, devices, and apparatuses may be configured in various ways for centralized access control for cloud relational database management system resources. For instance, FIG. 1A and FIG. 1B will now be described. FIG. 1A shows a block diagram of a system 100A, and FIG. 1B shows a block diagram of a cloud-based system 100B, each configured for centralized access control for cloud relational database management system resources.

As shown in FIG. 1A, system 100A includes user device(s) 102 (also user device 102 herein), database (DB) servers 104, an external policy store 106, and an intermediary policy service 108. In embodiments, user device 102, DB servers 104, external policy store 106, and intermediary policy service 108 communicate with each other over a network 112. In some implementations, intermediary policy service 108 is alternately located off of network 112 instead of in front of external policy store 106 as shown. It should be noted that in various embodiments different numbers of user devices and/or DB servers are present. Additionally, according to embodiments, any combination of the systems and/or components illustrated in FIG. 1A are present in system 100A.

Network 112 comprises different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments. In an example, network 112 may be a cloud-based platform network and/or enterprise network through which at least one user device 102 connects to a domain or server thereof.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for centralized access control for cloud relational database management system resources, as well as for performing client-side functions/operations of client-server scenarios associated with embodiments such as accessing internal database server resources, receiving a UI for selection of an application and/or a resource of a DB hosted by DB servers 104, and/or the like. User device 102 also includes additional components (not shown for brevity and illustrative clarity) including, but not limited to, components and subcomponents of other devices and/or systems herein, in various embodiments. In embodiments, user device 102 comprises an administrator device by which an administrator creates and/or modifies external access policies as described herein, and/or may correspond to information technology (IT) personnel with access to credentials for users.

Users may be members of a domain, in embodiments, which generally refers to a physical and/or logical system boundary under the control of an entity within which applications and/or services, such as applications that utilize database servers to run DBs, are hosted, offered, managed, and/or otherwise implemented, and also encompasses subdomains and/or the like in embodiments. Exemplary, non-limiting domains include, without limitation, web domains, tenancies of hosted cloud platforms, cloud service providers, enterprise systems, and/or any other type of network or system. A tenant is particular type of domain that is a representation of an organization in a cloud platform. The domain of the tenant in the cloud platform is its tenancy in which the tenant registers and manages applications, stores data/files, accesses services, etc.

DB servers 104 comprise one or more server computers or computing devices, such as an on-premises server(s) in addition to, or in lieu of, cloud-based servers. DB servers 104, as shown, include caches 110, respectively, in which external access policies for users are locally stored. Ones of caches 110 may comprise persistent caches for DBs hosted by DB servers 104, and/or may comprise other types of caches utilized for embodiments herein. Each of DB servers 104 may execute one or more instances of a DB server/engine that performs operations, transactions, queries, etc., on databases hosted by DB servers 104.

External policy store 106 comprises one or more server computers or computing devices, such as an on-premises server(s) in addition to, or in lieu of, cloud-based servers, having physical storage components associated therewith that store external access policies for users of user device(s) 102 that are used to access internal resources of DB servers 104, e.g., applications, data in databases, etc.

Intermediary policy service 108 comprises one or more server computers or computing devices, such as an on-premises server(s) in addition to, or in lieu of, cloud-based servers, that manage distribution of external access policies from external policy store 106 to DB servers 104. In embodiments, intermediary policy service 108 facilitates push and/or pull operations for this distribution.

Turning now to FIG. 1B, system 100B is a cloud-based embodiment of system 100A of FIG. 1A. As shown, system 100B includes a cloud platform 116. In embodiments, cloud platform 116 is a cloud-based platform such as Microsoft® Azure® from Microsoft Corporation of Redmond, WA, that is accessible by a user(s) of user device(s) 114 (also user device 114 herein) over a network (not shown for illustrative clarity and brevity).

User device 114 may be any type and/or number of user device, such as devices similar to those described for user device 102 in FIG. 1A, and may correspond to end users, customers, tenants, partners, administrators, and/or IT personnel associated different domains, services, and/or applications, such as different tenancies within cloud platform 116, that utilize accesses to resources of DB servers 118.

A tenant is a representation of an organization in a cloud platform. The domain of the tenant in the cloud platform is its tenancy in which the tenant registers and manages applications, stores data/files, accesses services, etc., hosted by cloud platform 116. That is, tenants are enabled to provide applications/services that utilize DBs of DB servers 118, as hosted by cloud platform 116, to users such as end users. In doing so, a tenant may lease or purchase the use of system resources within cloud platform 116 for such hosting and may monitor the system resources and/or operations.

As similarly described above for FIG. 1A, cloud platform 116 of FIG. 1B includes a user device(s) 114 (also user device 114 herein), database (DB) servers 118, an external policy store 122, and an intermediary policy service 120. In embodiments, user device 114, DB servers 118, external policy store 122, and intermediary policy service 120 communicate with each other via infrastructure and/or communication components of cloud platform 116, which may also be referred to herein as a "network." It should be noted that in various embodiments different numbers of user devices and/or DB servers are present. Additionally, according to embodiments, any combination of the systems and/or components illustrated in FIG. 1A are present in system 100A.

User device 114 may be an embodiment of user device 102 of FIG. 1A, DB servers 118 may be an embodiment of DB servers 104 of FIG. 1A, external policy store 122 may be an embodiment of external policy store 106 of FIG. 1A, and intermediary policy service 120 may be an embodiment of intermediary policy service 108 of FIG. 1A, in the context of cloud platform 116, having descriptions as, or similarly as, noted for respective portions of FIG. 1A. For example, each of DB servers 118 includes a cache of caches 124, which may be embodiments of caches 110 of FIG. 1A.

Cloud platform 116 includes one or more distributed or "cloud-based" servers, in embodiments. That is, cloud platform 116 is a network, or "cloud," implementation for applications and/or services in a network architecture/cloud platform. A cloud platform includes a networked set of computing resources, including servers, routers, etc., that are configurable, shareable, provide data security, and are accessible over a network such as the Internet, according to embodiments. Cloud applications/services are configured to run on these computing resources, often atop operating systems that run on the resources, for entities that access the applications/services, locally and/or over the network. A cloud platform such as cloud platform 116 is configured to support multi-tenancy as noted above, where cloud platform-based software services multiple tenants, with each tenant including one or more users who share common access to certain software services and applications of cloud platform 116, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

Figure 10:
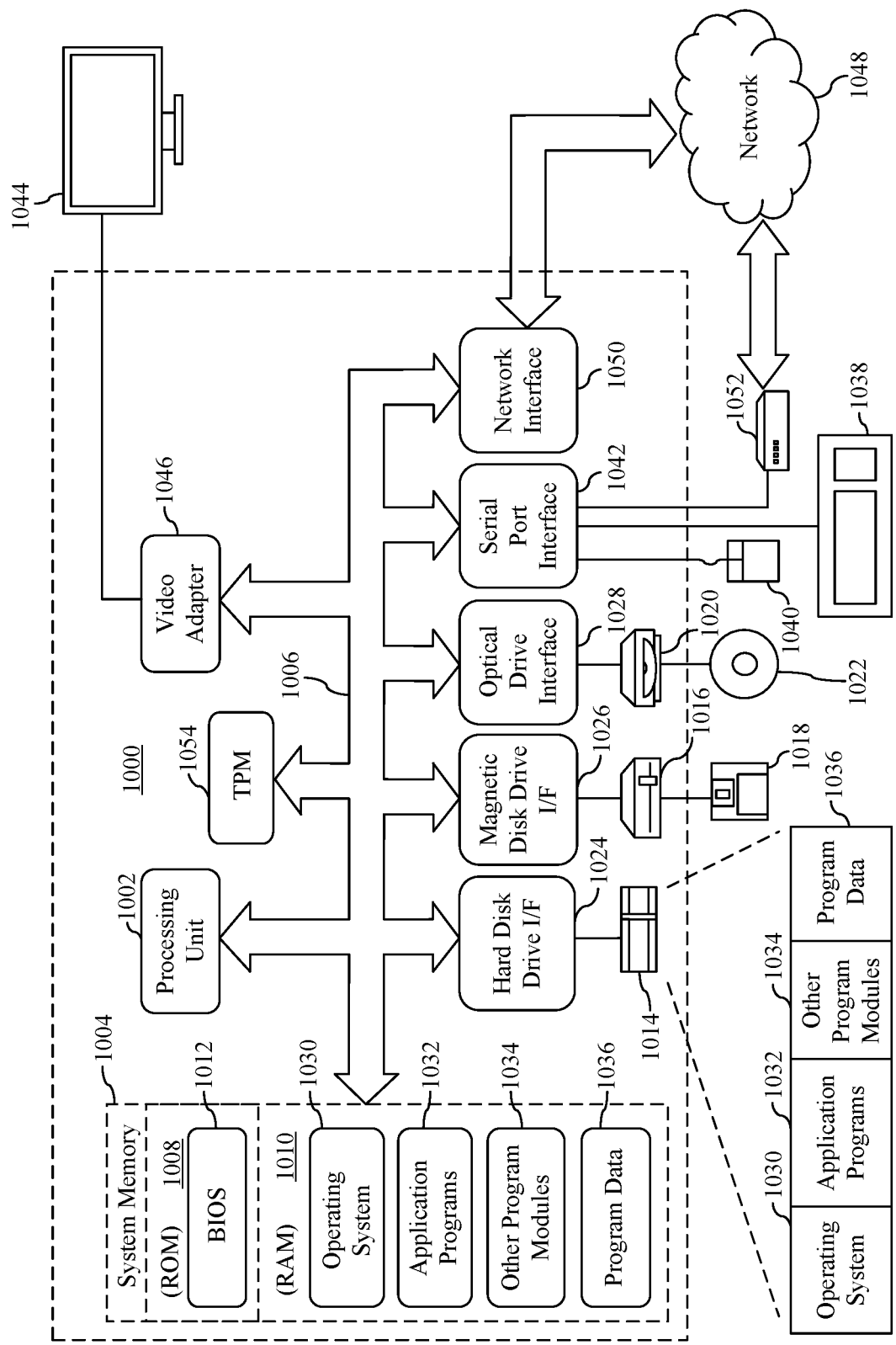
FIG. 10 shows a block diagram of an example computing device that may be used to implement embodiments.

Portions of FIGS. 1A and 1B, and system 100A and system 100B respectively, such as DB servers 104, external policy store 106, intermediary policy service 108, and/or cloud platform 116 also include additional components (not shown for brevity and illustrative clarity) including, but not limited to, components and subcomponents of other devices and/or systems herein, e.g., a user interface(s) (UI(s)), an operating system, as shown in FIG. 10 described below, etc., in embodiments.

Additionally, as would be understood by persons of skill in the relevant art(s) having the benefit of this disclosure, system 100A and system 100B illustrate embodiments in which system resources may be scaled out on demand or as needed, and the embodiments herein provide for creating, modifying, maintaining, and/or implementing external access policies, at varying degrees of granularity, in a central location for systems that include DB servers.

As described herein, systems, devices, and apparatuses, including components thereof, are configured in various ways for centralized access control for cloud relational database management system resources, in embodiments. For instance, FIGS. 2 and 3 will now be described in this context.

Figure 2:
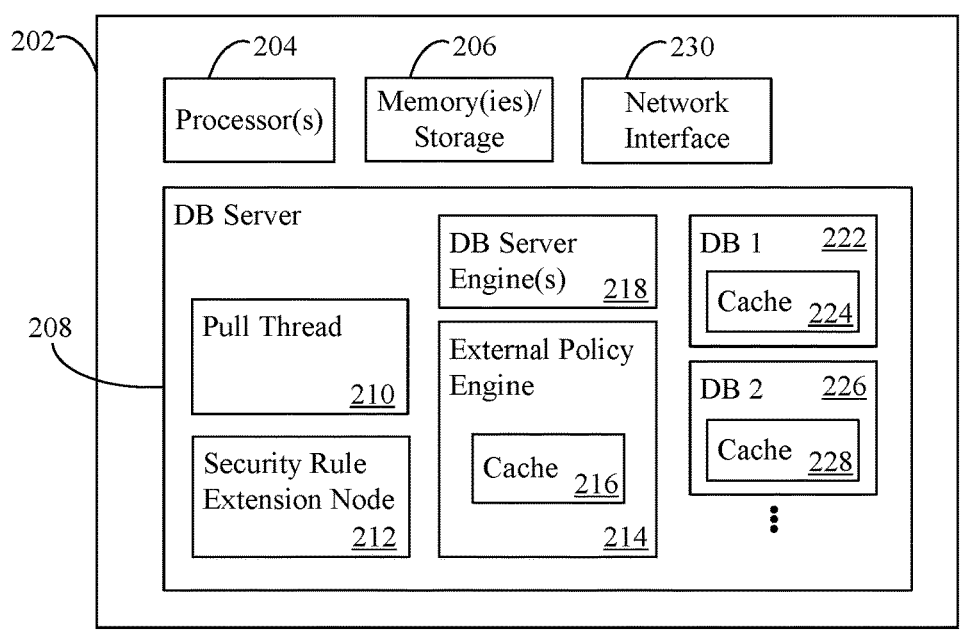
FIG. 2 shows a block diagram of a computing system configured for centralized access control for cloud relational database management system resources, according to an example embodiment.
Figure 3:
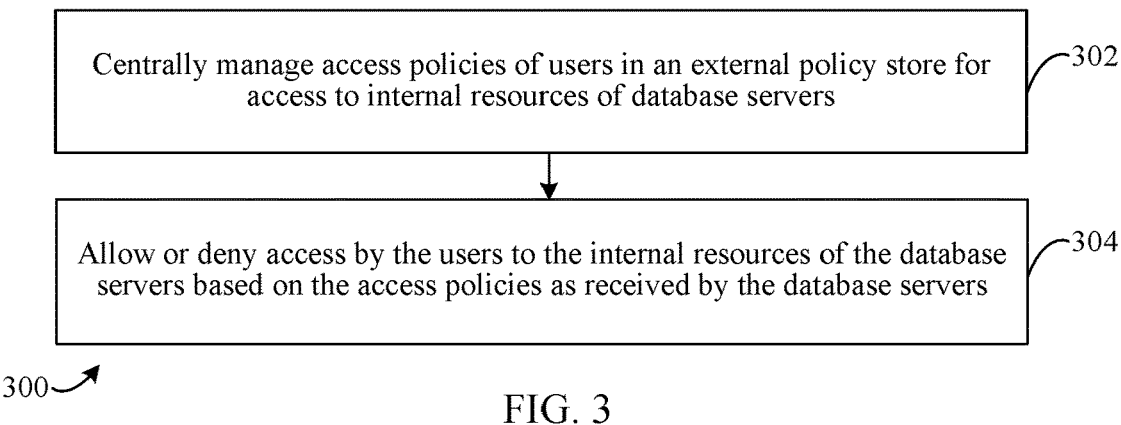
FIG. 3 shows a flowchart for centralized access control for cloud relational database management system resources, in accordance with an example embodiment.

Referring first to FIG. 2, a block diagram of a system 200 is shown for centralized access control for cloud relational database management system resources, according to an example embodiment. System 200 as exemplarily illustrated and described is configured to be an embodiment of system 100A of FIG. 1A and/or system 100B of FIG. 1B. FIG. 3 shows a flowchart 300 for centralized access control for cloud relational database management system resources, according to an example embodiment. System 200 may be configured to operate in accordance with flowchart 300. System 200 is described as follows.

System 200 includes a computing system 202 which is any type, number of, or one of a number of, server(s) or computing system(s), as mentioned elsewhere herein, or as otherwise known, including without limitation cloud-based systems, on-premises servers, distributed network architectures, and/or the like. As shown in FIG. 2, computing system 202 includes one or more processors ("processor") 204, one or more of a memory and/or other physical storage device ("memory") 206, as well as one or more network interfaces ("network interface") 228. Computing system 202 also includes a DB server instance 208 (also "DB server 208" herein) that is an embodiment of DB servers 104 and/or DB servers 118, of FIGS. 1A and 1B, respectively, and one or more databases illustrated exemplarily as DB 1 222 and DB 2 226 in FIG. 2. It is contemplated herein that any components of system 200 may be grouped, combined, separated, etc., from any other components in various embodiments, and that the illustrated example of system 200 in FIG. 2 is non-limiting in its configuration and/or numbers of components, as well the exemplary arrangement thereof.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., at least one cache for query processing), remote processors or memories, and/or distributed processors or memories. Processor 204 may be multi-core processors configured to execute more than one processing thread concurrently. Processor 204 may comprise circuitry that is configured to execute and/or process computer program instructions such as, but not limited to, embodiments of DB server 208, etc., including one or more of the components thereof as described herein, which may be implemented as computer program instructions, as described herein. For example, in performance of/operation for flowchart 300 of FIG. 3, and/or any other flowcharts, flow diagrams, processes, operations, etc., herein, processor 204 may execute program instructions as described.

Memory 206 includes volatile storage portions such as a random access memory (RAM) and/or persistent storage portions such as hard drives, non-volatile RAM, and/or the like, to store or be configured to store computer program instructions/code for centralized access control for cloud relational database management system resources as described herein, as well as to store other information and data described in this disclosure including, without limitation, embodiments of DB server 208, DB1 222, DB2 226, and/or the like, including one or more of the components thereof as described herein, and/or the like, in different embodiments. Memory 206 also includes caches as described herein, e.g., a persistent cache 224 of DB1 222 and a persistent cache 228 of DB2 226), in embodiments, as well as data, information, etc., as described herein for embodiments. In embodiments, persistent cache 224 of DB1 222 and persistent cache 228 of DB2 226 may respectively store a materialized table to store the external access policies received from the centralized, external policy store. The implementation of persistent caches ensure the external access policy checks also work on stale data when a database is out of sync in its external access policies.

Databases hosted by DB server 208, e.g., DB1 222 and DB2 226, as shown in FIG. 2, and/or any databases hosted by the DB servers described above for FIG. 1A and FIG. 1B, other systems described herein, etc., may be any type of database of data to which users request access for resources. A resource may include one or more portions of the data in a database, according to embodiments, and access request may include querying data for query results, adding data, modifying data, deleting data, and/or the like.

Network interface 230 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100A in FIG. 1A and/or system 100B in FIG. 1B, over a network/cloud platform such as network 112 and/or cloud platform 116.

System 200 also includes additional components (not shown for brevity and illustrative clarity) including, but not limited to, components and subcomponents of other devices and/or systems herein, as well as those described below with respect to FIG. 10, e.g., an operating system, etc., according to embodiments.

DB server 208 of computing system 202 includes a plurality of components for performing the functions and operations described herein for centralized access control for cloud relational database management system resources, in embodiments. As illustrated, DB server 208 includes a pull thread 210, a security rule extension node 212 (also "extension node 212" herein), an external policy engine 214 having an in-memory cache 216, and a DB server engine(s) 218, although additional components, as described herein or otherwise, are also included and some components may be excluded, in various embodiments. For example, pull thread 210, extension node 212, and/or external policy engine 214 may be a portion of DB server 208 in embodiments, or may be a separate component of system 200 in other embodiments.

Database server engine 218 may be an instance of an engine of a DB server of any type that is utilized to perform database/query operations on a DB hosted by a DB server, such as DB server 208. Database server engine 218 may include one or more components such as, but without limitation, a data definition language (DDL) engine, a type of query processor, and/or the like, as would be understood by persons of skill in the relevant art(s) having the benefit of this disclosure.

Pull thread 210 may be configured to perform a pull task to acquire or receive external access policies from a centralized, external policy store (e.g., external policy store 106 in FIG. 1A and/or external policy store 122 in FIG. 1B). In embodiments, the pull task is performed per database process by pull thread 210. In some embodiments, the pull task is performed periodically by pull thread 210. The pull thread may also be run per physical process, in embodiments. Pull thread 210 performs the pull tasks for complete and/or deltas of external access policies and is configured to update the persistent cache in each database of a database server (e.g., persistent cache 224 and/or persistent cache 228 as shown in FIG. 2).

External policy engine 214 is configured to evaluate externally-defined access policy data. In embodiments, external policy engine 214 comprises a software development kit (SDK) or a "devkit" to receive requests from user device, e.g., via a UI, console, and/or other client-side access tools, for access to internal database resources. External policy engine 214 includes, in embodiments, an in-memory cache 216 that stores the externally-defined access policy to perform checks/evaluations of thereof more efficiently, enabling faster performance of these operations. In embodiments, the in-memory cache 216 comprises a singleton object per DB server and may be initialized with the respective DB server.

Security rule extension node 212 is configured to enable DB server engine 218 to process both internal permission checks (i.e., for permissions and access policies managed inside DB server engine 218) as well as external permission checks (i.e., for permissions and access policies managed outside or externally to DB server engine 218, such as those of external policy stores described herein). In embodiments, both internal and external access policies for internal DB resources may comprise security rules as hierarchical or tree structures, where each node in the structure is an expression which can be evaluated to a Boolean value. The final result of the check/evaluation to allow or deny an access request may thus be the root Boolean value of the data structure.

In centralized, external access policy systems, as described herein for embodiments, extension node 212 may be implemented as a leaf node of an expression such that when the access evaluation starts, the DB server is enabled to recursively evaluate each leaf node of the data structure, including extension node 212, to account for both internal and external access policies in determining whether access to an internal DB resource is to be allowed or denied. Additional details regarding such data structures and access policies are provided below.

Turning also now to FIG. 3, flowchart 300 begins with step 302. In step 302, access policies of users are centrally managed in an external policy store for access to internal resources of database servers. For example, persistent cache 224 of DB 1 222 and persistent cache 228 of DB2 226 of FIG. 2 are configured to store external access policies received by a centralized, external policy store, e.g., external policy store 106 of FIG. 1A and/or external policy store 122 of FIG. 1B, that manages the external access policies, where the external access policies enable users of DB servers to access internal resources thereof. Accordingly, a set of external access policies can be distributed to a plurality of DB servers in a system, e.g., a cloud-based environment, from a single, centrally-managed store.

Flowchart 300 of FIG. 3 continues with step 304. In step 304, access by the users to the internal resources of the database servers is allowed or denied based on the access policies as received by the database servers. For example, DB server 208 of FIG. 2 is configured to determine if a user is allowed to or denied from accessing an internal resource, e.g., of DB1 222, DB2 226, and/or the like, based on the received external access policies from the external policy store. UI logic 226 is configured to generate and provide a UI to a user that enables a one-click selection of determined configuration settings for any number of system metrics to be monitored.

Accordingly, the embodiments herein provide for external access policies for internal resources hosted by DB servers, via management of permission policies outside the database servers and hosted database engines, enabling a creation or updating of policies without logging into each database server/database itself, and by the centralized, external storage of permission policies, enabling provision thereof to clusters of database server resources where the permissions being granted or revoked are applied to all database servers, thus alleviating need to create permissions at each database server while also providing for the scalability of managing clusters of database servers with improved system efficiency and no policy drift.

Figure 4:
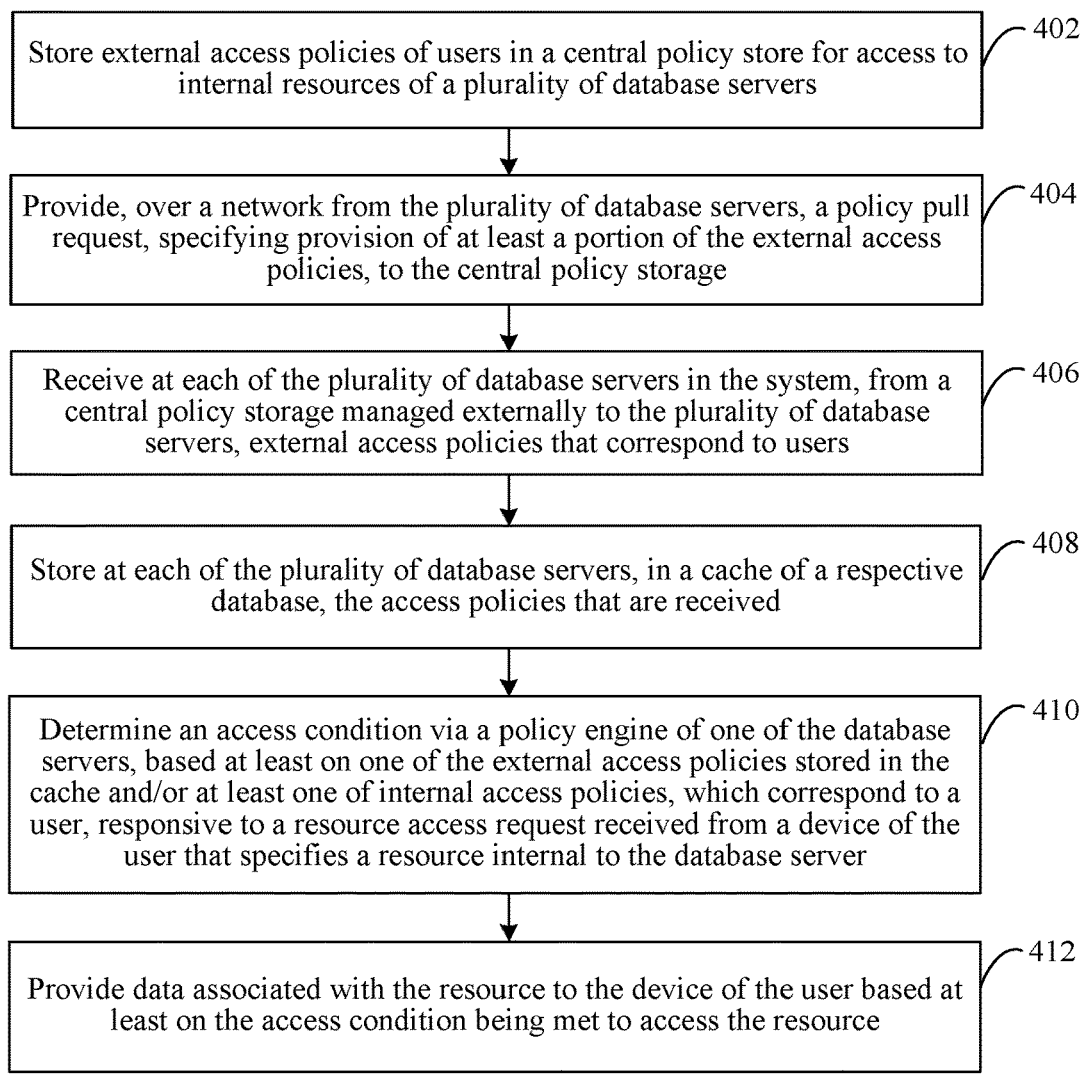
FIG. 4 shows a flowchart for centralized access control for cloud relational database management system resources, in accordance with an example embodiment.
Figure 5:
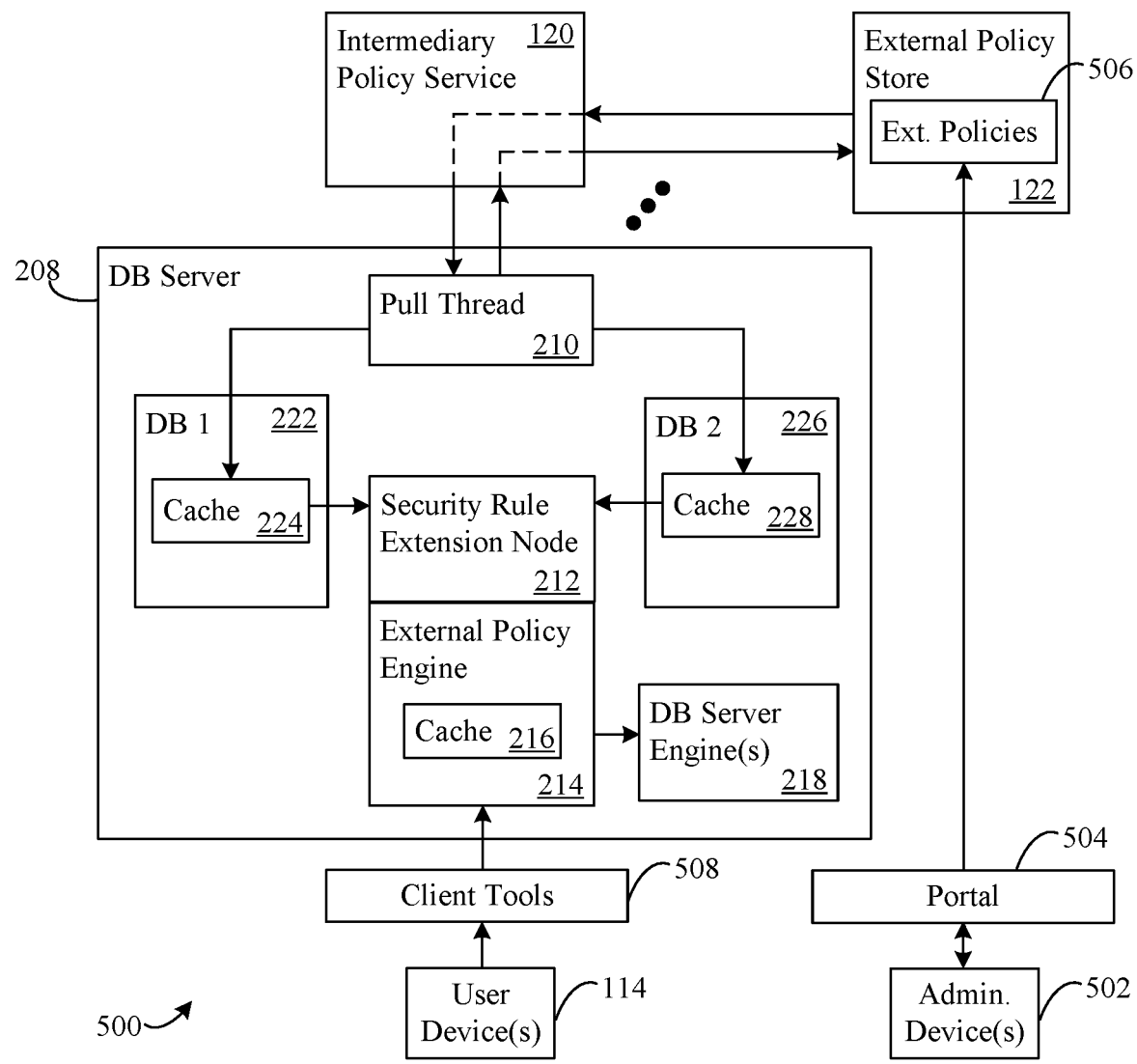
FIG. 5 shows a block diagram of a computing system for centralized access control for cloud relational database management system resources, in accordance with an example embodiment.
Figure 6:
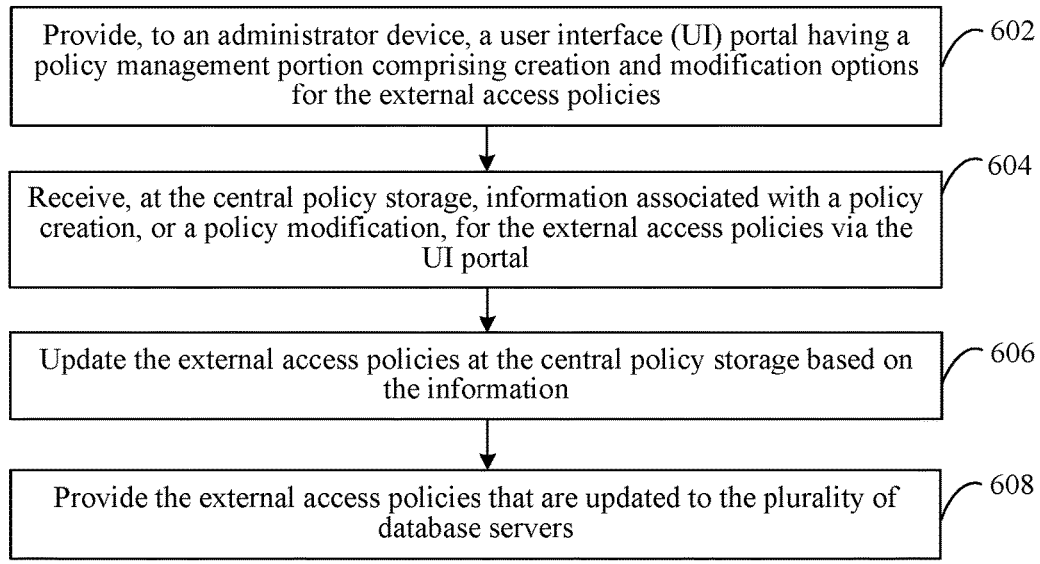
FIG. 6 shows a flowchart for centralized access control for cloud relational database management system resources, in accordance with an example embodiment.

As noted above for FIGS. 1A, 1B, and 2, embodiments herein provide for centralized access control for cloud relational database management system resources. System 100A of FIG. 1A, system 100B of FIG. 1B, and/or system 200 of FIG. 2 may be configured to perform functions and operations for such embodiments. It is further contemplated that the systems and components described above are configurable to be combined in any way. FIG. 4, FIG. 5, and FIG. 6 will now be described.

FIG. 4 shows a flowchart 400 for centralized access control for cloud relational database management system resources, according to example embodiments. System 100A in FIG. 1A, System 100B in FIG. 1B, and/or system 200 in FIG. 2 are configured to operate according to flowchart 400, which is an embodiment of flowchart 300 of FIG. 3. Further structural and operational examples will be apparent to persons skilled in the relevant art(s) based on the following descriptions. Flowchart 400 is described below with respect to system 200 of FIG. 2, and with respect to FIG. 5 and FIG. 6.

FIG. 5 shows a system 500 for centralized access control for cloud relational database management system resources, according to example embodiments. System 500 is an embodiment of FIG. 1B and FIG. 2, described above, in the context of a cloud-based implementation, although on-premise implementations are also contemplated in view of FIG. 1A and FIG. 2. FIG. 6 shows a flowchart 600 for centralized access control for cloud relational database management system resources, according to example embodiments, which is an embodiment of flowchart 400 in FIG. 4.

Regarding FIG. 4, flowchart 400 begins with step 402. In step 402, external access policies of users are stored in a central policy store for access to internal resources of a plurality of database servers. For example, an external policy store, as described herein, is configured to store/stores external access policies in a centrally-located storage that is external to database servers in a system, such as illustrated and described above for FIG. 1B (and FIG. 1A). These external access policies are associated with users of the database servers, and determine user access to internal database server resources.

As an example, and referring also to FIG. 5, external policy store 122 from FIG. 1B is illustrated as including external access policies 506 (i.e., shows as "ext. policies 506"). These external access policies are stored and managed in external policy store 122 outside of DB server 208 (as described for FIG. 2), which may be one of many DB servers in system 500 as a cloud-based implementation. External access policies 506 are managed, created, updated, and/or otherwise modified, by administrators, as an example, associated with a group or entity or tenant to which the users belong. This policy management process is exemplarily described in FIG. 6, below with reference to FIG. 5 and system 500, which may performed before, during, or after performance of the steps in flowchart 400 described for FIG. 4.

In FIG. 6, flowchart 600 begins at step 602. In step 602, a user interface (UI) portal having a policy management portion comprising creation and modification options for the external access policies is provided to an administrator device. For instance, with reference to FIG. 5, an administrator device 502 (which may be an embodiment of user device 114 of FIG. 1B) is provided with a UI for external access policy management, via a portal 504, which includes creation and modification options for external access policies 506 stored/to be created at external policy store 122.

In step 604 of flowchart 600, information associated with a policy creation, or a policy modification, for the external access policies is received at the central policy storage via the UI portal. For example, subsequent to step 602, an administrator is enabled to enter information, e.g., via text fields, buttons, dropdown menus, and/or the like, in the UI for creating or modifying a user's or users' external access policy(ies) 506 to access internal database server resources, e.g., of DB server 208 and/or other DB servers in the system, and the information is provided to and received by external policy store 112.

In step 606 of flowchart 600, the external access policies at the central policy storage are updated based on the information. For example, external policy store 112 is configured to update, e.g., create, modify, and/or the like, one or more of external access policies 506 utilizing the information provided by administrator device 502 via portal 504, as described above.

In step 608 of flowchart 600, the external access policies that are updated are provided to the plurality of database servers. For instance, one or more of external access policies 506 are provided to one or more DB servers in system 500, e.g., DB server 208, via pull operations (e.g., in conjunction with pull thread 210) and/or push operations (e.g., by external policy store 122 periodically and/or based on policy modifications/updates) as described in further detail herein.

As an example, and referring back to FIG. 4, in step 404 of flowchart 400, a policy pull request, specifying provision of at least a portion of the external access policies, is provided over a network from the plurality of database servers to the central policy storage. For instance, pull thread 210 of DB server 208, and/or one or more other DB servers, is configured to provide policy pull requests, via intermediary policy service 120, to external policy store 122. The policy pull requests may specify for provision of all external access policies 506 (e.g., at an initial deployment of DB server 208), all external access policies 506 for DBs hosted by DB server 208 (e.g., at an initial deployment, a failover, or a start/restart of DB server 208), updates/modifications to external access policies 506 since the most recent policy pull request (e.g., at an initial deployment, a failover, or a restart of DB server 208, or periodically), and/or the like, from external policy store 122. Additionally, provision of all subscription and resource group level policies are also contemplated via policy pull requests. In embodiments, pull requests from DB servers of system 500 may be synchronized, while in other embodiments, intermediary policy service 120 may provide a single policy pull request to external policy store 122 on behalf of the DB servers in system 500.

In step 406 of flowchart 400, external access policies that correspond to users are receive at each of the plurality of database servers in the system from a central policy storage managed externally to the plurality of database servers. For example, external policy store 122 is configured to provide back one or more user-associated external access policies that are received by DB servers in system 500 based on policy pull requests from pull thread 210 described above for step 404.

In step 408 of flowchart 400, the access policies that are received are stored at each of the plurality of database servers in a cache of a respective database. For instance, as shown in system 500 of FIG. 5, received external access policies may be provided by pull thread 210 to persistent cache 224 of DB1 222 and to persistent cache 228 of DB2 226 which are hosted by DB server 208 to update external access policies stored by persistent cache 224 and persistent cache 228. Security rule extension node 212, as described above for FIG. 2, enables DB servers of system 500 to process both internal permission checks as well as external permission checks, and in embodiments, is implemented as a leaf node of an expression such that when the access evaluation starts, DB server engine 218 is enabled to recursively evaluate each leaf node of the data structure, including extension node 212, to account for both internal and external access policies in determining whether access to an internal DB resource is to be allowed or denied. As shown in system 500 of FIG. 5, access policies stored by persistent cache 224 and persistent cache 228, before and/or after updates to external access policies are stored, are provided to external policy engine 214, via extension node 212, for storage by in-memory cache 216 of external policy engine 214, improving processing and timing efficiencies for access check determinations. During this provision, extension node 212 structures the external access policy information for use in access check determinations, e.g., by adding external access policy conditions to a leaf or leaves of a data structure that comprises external access policies.

In step 410 of flowchart 400, an access condition is determined via a policy engine of one of the database servers, based at least on one of the external access policies stored in the cache and/or at least one of internal access policies, which correspond to a user, responsive to a resource access request received from a device of the user that specifies a resource internal to the database server. For example, external policy engine 214 is configured to determine an access condition, e.g., a condition for external access policies to allow or deny access to an internal resource of DB server 208, in embodiments. The overall determination of the access condition may be made based on external and/or internal access policies. For external access policies, this policy information for a user that is stored by in-memory cache 216 and information/credentials provided to DB server 208 from user device 114 via client tools 508 (that provide an interface therebetween for access to the internal resource) are processed by external policy engine 214 to determine whether or not one of external access policies 506 allows the requesting user to access the specified internal resource.

In embodiments, as noted herein, both internal and external access policies for internal DB resources may comprise security rules as hierarchical or tree structures, where each node in the structure is an expression which can be evaluated to a Boolean value, and may be used to determine if access is granted or denied. When internal access policies are also considered, the external access policy condition is provided to DB server engine 218 as shown in FIG. 5 where it is used in conjunction with an internal access check of the internal access policies. The final result of the check/evaluation to allow or deny an access request may thus be the root Boolean value of the overall data structure that takes both internal and external conditions into account. Additional details are provided below with respect to FIG. 7.

In step 412 of flowchart 400, data associated with the resource is provided to the device of the user based at least on the access condition being met to access the resource. For example, based on an access condition, as described above, that indicates access is granted or allowed for the internal resource, e.g., data from DB1 222, DB2 226, and/or the like, DB server engine 218 in FIG. 5 may perform operations to provide data associated with the internal resource to user device 114. In embodiments, providing this data may include, without limitation, actual data in a DB, information associated with data in the DB, information/results associated with one or more operations on the data in the DB performed by DB server engine 218, and/or the like.

Figure 7A:
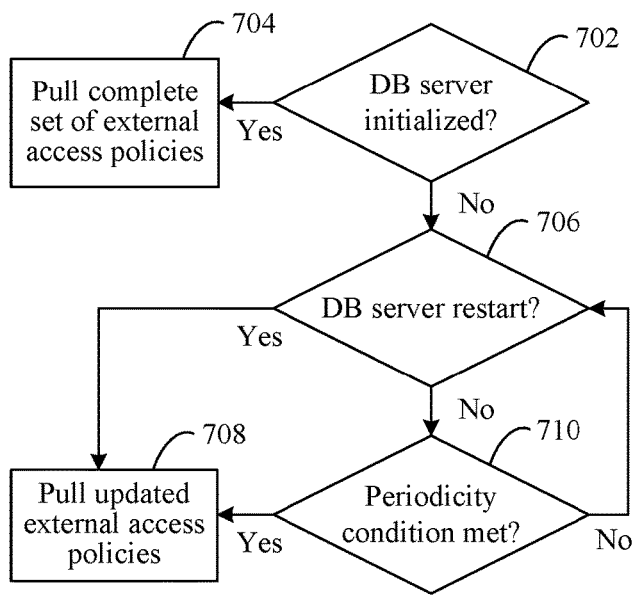
FIG. 7A shows a flow diagram for centralized access control for cloud relational database management system resources, in accordance with an example embodiment.
Figure 7B:
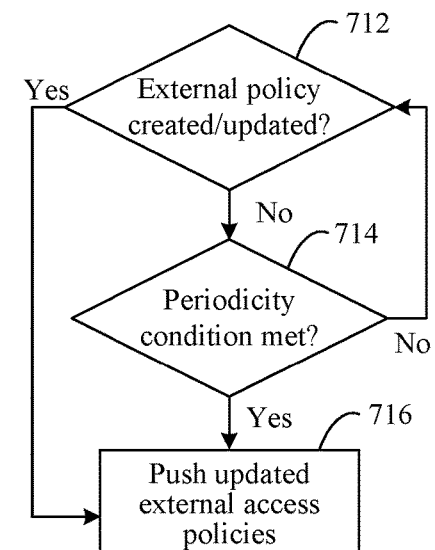
FIG. 7B shows a flow diagram for centralized access control for cloud relational database management system resources, in accordance with an example embodiment.

FIG. 7A and FIG. 7B will now be described. FIG. 7A shows a flow diagram 700A for external access policy pull requests or operations for centralized access control for cloud relational database management system resources, according to an example embodiment, and FIG. 7B shows a flow diagram 700B for external access policy push operations for centralized access control for cloud relational database management system resources, according to an example embodiment. Flow diagram 700A may be an embodiment of step 404 in flowchart 400 of FIG. 4 and be may be performed via pull thread 210 of FIGS. 2 & 5, and flow diagram 700B may be an alternative embodiment of step 404 in flowchart 400 of FIG. 4 and be performed via external policy store 106 of FIG. 1A and/or external policy store 122 of FIGS. 1B & 5, in embodiments.

Flow diagram 700A and/or flow diagram 700B may be repeated in embodiments, based on system initializations, restarts, failovers, completion of the respective flow diagrams, and/or the like.

Flow diagram 700A begins at step 702 where pull thread 210 determines if the DB server in which it is instantiated has been newly initialized. If so, pull thread 210 executes a policy pull request or operation 704 provided to external policy store 122 which specifies that a complete set of external access policies for the DB server be provided. If the determination at step 702 indicates the DB server is not newly-initialized, flow diagram 700A proceeds to step 706 where pull thread 210 determines if the DB server has restarted (or is in a failover condition, in embodiments). If so, pull thread 210 executes a policy pull request or operation 708 provided to external policy store 122 which specifies that a set of updated external access policies for the DB server be provided where the updated policies comprise external policies that have been created, updated, or otherwise modified since the last policy pull request, i.e., deltas of the external access policies maintained at external policy store 122. If the determination at step 706 indicates the DB server is not restarted, or is not in a failover condition, flow diagram 700A proceeds to step 710 where pull thread 210 determines if a periodicity condition at the DB server has been met. For example, a timer (not shown for brevity and illustrative clarity herein) may be used to enable pull thread 210 to issue policy pull requests based a number of seconds, minutes, hours, etc., that have passed since the last policy pull request was issued. If the periodicity condition is met, flow diagram 700A proceeds to step 708 described above—if not, flow diagram 700A may return to step 706.

Flow diagram 700B begins at step 712 where it is determined by external policy store 122 if an external access policy, e.g., of external access policies 506 in FIG. 5, has been created, updated, or modified in some way. If so, flow diagram 700B continues to step 716 where external policy store 122 pushes updated external access policies to applicable DB servers in the system. If not, flow diagram 700B continues to step 714 where it is determined by external policy store 122 if a periodicity condition has been met for pushing updated external access policies to DB servers. For example, a timer (not shown for brevity and illustrative clarity herein) may be used to enable external policy store 122 to issue policy pushes based a number of seconds, minutes, hours, etc., that have passed since the last policy pull request was issued. If the periodicity condition is met, flow diagram 700B proceeds to step 716 described above—if not, flow diagram 700B may return to step 712. In these described push embodiments, pull thread 210 may also comprise a push policy receive portion to receive pushed external access polices provided by external policy store 122.

Flow diagram 700A and/or flow diagram 700B may be repeated in embodiments, based on system initializations, restarts, failovers, completion of the respective flow diagrams, and/or the like.

Referring now to FIG. 8, a data structure 800 for access policies for centralized access control for cloud relational database management system resources is shown, according to an example embodiment. As noted above, external and/or internal access policies may be configured in hierarchical data structures for determinations of access grants/denials to internal server resources. Data structure 800 represents a simplified, illustrative hierarchical data structure for brevity, and it is contemplated herein that embodiments include data structures with any number of leaf nodes/leaves for different types of access policies, including granular scopes thereof, for access to internal DB server resources. Data structure 800, as shown, includes an external policy portion 802, an internal policy portion 804, and a root condition 806.

External policy engine 214, as shown in FIGS. 2 and 5, is configured to recursively iterate over external policy portion 802 of data structure 800 to determine an external condition 808 for allowing or denying access to internal resources for the external access policies represented in external policy portion 802. For example, as illustrated an external policy leaf 1 810 and an external policy leaf 2 812 are recursively iterated over by external policy engine 214 to determine external condition 808 which may then be passed to a DB server engine for a determination of root condition 806. While two external leaves are shown, i.e., external policy leaf 1 810 and an external policy leaf 2 812, it is contemplated that any number of leaves, representing different granularities of access privileges, may be implemented in embodiments.

An internal policy engine of DB server engine 218, as shown in FIGS. 2 and 5, is configured to recursively iterate over internal policy portion 804 of data structure 800 to determine an internal condition 814 for allowing or denying access to internal resources for the internal access policies represented in internal policy portion 802. For instance, as illustrated an internal policy leaf 1 816 and an internal policy leaf 2 818 (although other numbers of leaves, including zero, are contemplated herein) are recursively iterated over by the internal policy engine to determine internal condition 814 from which a determination of root condition 806 is made with external condition 808. In embodiments where only external access policies, and thus only an external policy portion 802 is present in data structure 800, root condition 806 may be determined based on external policy portion 802 alone.

As noted herein, a hierarchical data structure may be used, as shown for data structure 800, where each node or leaf in the data structure is an expression which can be evaluated to a Boolean value, and where the final result of the check/evaluation to allow or deny an access request, e.g., root condition 806, may thus be the root Boolean value of data structure 800. In such implementations, either an internal condition or an external condition that indications denying access will override any indications of granting access to an internal resources.

Furthermore, and as noted herein, different levels of granularity for external access policies are contemplated, in embodiments. For example, when an administrator creates or modifies an external policy as described above with respect to FIG. 5 and FIG. 6, granularity for access to internal DB server resources may be specified, without limitation, from a subscription level down to a data column level, based on attribute values specified in the external access policies. That is, granularity levels may be set for a subscription, a resource group, a database server, database schema, a database table, and/or a column of data, in various embodiments. For instance, external access policies may include one or more of the following example scope levels:

/Subscriptions/
/Subscriptions/SUB/
/Subscriptions/SUB/ResourceGroup/R
/Subscriptions/SUB/ResourceGroup/R/Servers/S
/Subscriptions/SUB/ResourceGroup/R/Servers/S/DBs/D1
/Subscriptions/SUB/ResourceGroup/R/Servers/S/DBs/D2
/Subscriptions/SUB/ResourceGroup/R/Servers/S/DBs/D1/Schema/S1
/Subscriptions/SUB/ResourceGroup/R/Servers/S/DBs/D1/Schema/S2
/Subscriptions/SUB/ResourceGroup/R/Servers/S/DBs/D1/Schema/S1/Table/T1
/Subscriptions/SUB/ResourceGroup/R/Servers/S/DBs/D1/Schema/S1/Table/T1/Col/C1

Additionally, embodiments herein contemplate granular permissions for database objects (e.g., functions) and/or a database-related operations. For example, DDL and data manipulation language (DML) operation-level granularity for permissions associated with operations and/or similar/equivalent operations, including but without limitation: execute, alter, add, drop, create, etc.; and insert, update, delete, select, etc. Furthermore, multiple external policies may be generated and maintained for any given user. For instance, a single user may have external policies for different resources, and/or multiple policies within a given resource.

Moreover, in embodiments, the attribute values section in an external access policy controls the principal who has been assigned of the policy where there may be only one identifier per principal for all DB servers in the system. Thus, the user account needs to be created only once and assigned the external access policy(ies) only once in the centralized external policy store of the system. Subsequently, the user is enabled to perform operations defined in the policy on all resources defined by the scopes in all DB servers within the centrally managed system.

FIG. 9 shows a flowchart 900 for centralized access control for cloud relational database management system resources, according to an example embodiment. Flowchart 900 may be an embodiment of flowchart 400 of FIG. 4, and system 200 of FIG. 2 and/or system 500 of FIG. 5 may be configured to operate in accordance therewith. In embodiments, flowchart 900 may follow step 412 of flowchart 400. Flowchart 900 is described as follows.

Flowchart 900 begins with step 902. In step 902, another access condition is determined via the policy engine of one of the database servers, based at least on another one of the external access policies, stored in the cache, which corresponds to another user, responsive to another resource access request received from another device of the other user that specifies the resource or another resource internal to the database server. For example, external policy engine 214 (as described for FIGS. 2 & 5) is configured to determine an access condition, e.g., a condition for external access policies to allow or deny access to an internal resource of DB server 208 (as described for FIGS. 2 & 5), in embodiments, and with respect to step 902, for another user that attempts to access an internal DB server resource in the system. External access policy information for this other user, if existing, is stored by in-memory cache 216 (as described for FIGS. 2 & 5) and information/credentials provided to DB server 208 from a device of user device(s) 114 for this other user, via client tools 508 of FIG. 5 (that provide an interface therebetween for access to the internal resource) are processed by external policy engine 214 to determine whether or not one of external access policies 506 of FIG. 5 allows this requesting other user to access the specified internal resource.

In step 904, access of the other device of the other user to the data associated with the resource or to other data associated with the other resource is denied based at least on the access condition being unmet by at least one of the one of the internal access policies or the one of the external access policies indicating a denial of access. For instance, based on an access condition, as described herein, that indicates access is denied for the requested internal resource, e.g., data from DB1 222, DB2 226, and/or the like as noted herein, DB server engine 218 in FIG. 5 may notify the other user of the lack of permissions and prevent access to and/or performance of operations on the internal resource.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100A in FIG. 1A, system 100B in FIG. 1B, system 200 in FIG. 2, system 500 of FIG. 5, along with any components and/or subcomponents thereof, as well any operations and portions of flowcharts/flow diagrams and data structures described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 10 depicts an exemplary implementation of a computing device 1000 in which embodiments may be implemented. For example, embodiments described herein may be implemented in one or more computing devices or systems similar to computing device 1000, or multiple instances of computing device 1000, in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, servers, and/or clusters, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as but not limited to system 100A in FIG. 1A, system 100B in FIG. 1B, system 200 in FIG. 2, system 500 of FIG. 5, along with any components and/or subcomponents thereof, as well any operations and portions of flowcharts/flow diagrams and data structures described herein and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

TPM 1054 may be connected to bus 1006, and may be an embodiment of any TPM, as would be understood by one of skill in the relevant art(s) having the benefit of this disclosure. For example, TPM 1054 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media (e.g., computer-readable storage medium) are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for centralized access control for cloud relational database management system resources. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

Embodiments for systems and devices are contemplated being implemented for RDBMS resources, platforms, and/or architectures, even if not expressly stated. According to the novel and unique described embodiments for centralized access control for cloud relational database management system resources, scalability in relational database resource access determinations is enabled using a single, centralized access check system that resides outside the database servers, and provides for provision of maintained external access policies to any number of database servers in the system.

Prior solutions at best utilize a cache for storing updates to access policies for database servers, such implementations do not allow for scalability and fail to isolate the root cause of this issue. In contrast, the embodiments herein utilize a centrally located, external policy store and per server instance pull threads, two-level caching systems (e.g., a persistent cache in databases which is materialized as well as an in-memory cache for external policy engines, which is faster to consume), and a hierarchical structure of policy formats with a tree-based check access evaluation structure to achieve a balance between system performance, reliability, and scalability to improve over issues with access for resources internal to database servers. These and other improvements described herein for system performance and resource utilization were previously not available for software-based services and database hosting, much less for the specific database server implementations, organizations, and architectures in the embodiments described herein.

The additional examples and embodiments described in this Section may be applicable to examples disclosed in any other Section or subsection of this disclosure. Embodiments in this description provide for systems, devices, and methods for centralized access control for cloud relational database management system resources. For example, a system is described herein for such embodiments. The system includes a memory that stores program instructions and a processing system, comprising at least one processor, configured to execute the program instructions that, when executed, cause the processing system to perform operations. The operations include to receive at each of a plurality of database servers in the system, from a central policy storage managed externally to the plurality of database servers, external access policies that correspond to users, store at each of the plurality of database servers, in a cache of a respective database, the access policies that are received, determine an access condition via a policy engine of one of the database servers, based at least on one of the external access policies, stored in the cache, which corresponds to a user, responsive to a resource access request received from a device of the user that specifies a resource internal to the database server, and provide data associated with the resource to the device of the user based at least on the access condition being met to access the resource.

In and embodiment of the system, the program instructions, when executed, cause the processing system to perform said determine the access condition via the policy engine of one of the database servers also based at least on one of internal access policies, stored in the cache, which also corresponds to the user.

In and embodiment of the system, the internal access policies and external access policies are stored in a hierarchical data structure in the cache, and the program instructions, when executed, cause the processing system in performance of said determine the access condition to determine that both of the one of the internal access policies and the one of the external access policies indicate a grant of access.

In and embodiment of the system, the internal access policies and external access policies are stored in a hierarchical data structure in the cache, and the program instructions, when executed, cause the processing system to determine another access condition via the policy engine of one of the database servers, based at least on another one of the external access policies, stored in the cache, which corresponds to another user, responsive to another resource access request received from another device of the other user that specifies the resource or another resource internal to the database server, and deny access of the other device of the other user to the data associated with the resource or to other data associated with the other resource based at least on the access condition being unmet by at least one of the one of the internal access policies or the one of the external access policies indicating a denial of access.

In and embodiment of the system, the program instructions, when executed, cause the processing system to provide, over a network from the one of the database servers, a policy pull request to the central policy storage based on one or more of: a starting or restarting of the one of the database servers, a periodicity condition, or a failover condition, and the policy pull request specifies provision of the external access policies to the one of the database servers.

In and embodiment, the system includes the central policy storage and the users comprise a directory of the system; the program instructions, when executed, cause the processing system to: provide, to an administrator device, a user interface (UI) portal having a policy management portion comprising creation and modification options for the external access policies, receive, at the central policy storage, information associated with a policy creation, or a policy modification, for the external access policies via the UI portal, update the external access policies at the central policy storage based on the information, and provide the external access policies that are updated to the plurality of database servers.

In and embodiment of the system, one or more of the external access policies include a granular access policy corresponding to at least one of a database server, a database, a database schema, a database table, a column of data, a database object, or a database-related operation.

A method performed by a computing system is also provided herein. The method includes receiving at each of a plurality of database servers in the system, from a central policy storage managed externally to the database server, external access policies that correspond to users, storing at each of the plurality of database servers, in a cache of a respective database, the access policies that are received, determining an access condition via a policy engine of one of the database servers, based at least on one of the external access policies, stored in the cache, which corresponds to a user, responsive to a resource access request received from a device of the user that specifies a resource internal to the database server, and providing data associated with the resource to the device of the user based at least on the access condition being met to access the resource.

In an embodiment, the method includes performing said determining the access condition via the policy engine of one of the database servers also based at least on one of internal access policies, stored in the cache, which also corresponds to the user.

In an embodiment of the method, the internal access policies and external access policies are stored in a hierarchical data structure in the cache, and determining the access condition includes determining that both of the one of the internal access policies and the one of the external access policies indicate a grant of access.

In an embodiment of the method, the internal access policies and external access policies are stored in a hierarchical data structure in the cache, and the method includes determining another access condition via the policy engine of one of the database servers, based at least on another one of the external access policies, stored in the cache, which corresponds to another user, responsive to another resource access request received from another device of the other user that specifies the resource or another resource internal to the database server, and denying access of the other device of the other user to the data associated with the resource or to other data associated with the other resource based at least on the access condition being unmet by at least one of the one of the internal access policies or the one of the external access policies indicating a denial of access.

In an embodiment, the method includes providing, over a network from the one of the database servers, a policy pull request to the central policy storage based on one or more of: a starting or restarting of the one of the database servers, a periodicity condition, or a failover condition, and the policy pull request specifies provision of the external access policies to the one of the database servers.

In an embodiment, the method includes providing, to an administrator device, a user interface (UI) portal having a policy management portion comprising creation and modification options for the external access policies, receiving, at the central policy storage, information associated with a policy creation, or a policy modification, for the external access policies via the UI portal, updating the external access policies at the central policy storage based on the information, and providing the external access policies that are updated to the plurality of database servers.

In an embodiment of the method one or more of the external access policies include a granular access policy corresponding to at least one of a database server, a database, a database schema, a database table, a column of data, a database object, or a database-related operation.

A computer-readable storage medium having program instructions recorded thereon that, when executed by a processing system, perform a method is also provided herein, where the method includes receiving at each of a plurality of database servers in the system, from a central policy storage managed externally to the database server, external access policies that correspond to users, storing at each of the plurality of database servers, in a cache of a respective database, the access policies that are received, determining an access condition via a policy engine of one of the database servers, based at least on one of the external access policies, stored in the cache, which corresponds to a user, responsive to a resource access request received from a device of the user that specifies a resource internal to the database server, and providing data associated with the resource to the device of the user based at least on the access condition being met to access the resource.

In an embodiment of the computer-readable storage medium, the method includes performing said determining the access condition via the policy engine of one of the database servers also based at least on one of internal access policies, stored in the cache, which also corresponds to the user.

In an embodiment of the computer-readable storage medium, the internal access policies and external access policies are stored in a hierarchical data structure in the cache, and determining the access condition in the method includes determining that both of the one of the internal access policies and the one of the external access policies indicate a grant of access.

In an embodiment of the computer-readable storage medium, the internal access policies and external access policies are stored in a hierarchical data structure in the cache, and the method includes determining another access condition via the policy engine of one of the database servers, based at least on another one of the external access policies, stored in the cache, which corresponds to another user, responsive to another resource access request received from another device of the other user that specifies the resource or another resource internal to the database server, and denying access of the other device of the other user to the data associated with the resource or to other data associated with the other resource based at least on the access condition being unmet by at least one of the one of the internal access policies or the one of the external access policies indicating a denial of access.

In an embodiment of the computer-readable storage medium, the method includes providing, to an administrator device, a user interface (UI) portal having a policy management portion comprising creation and modification options for the external access policies, receiving, at the central policy storage, information associated with a policy creation, or a policy modification, for the external access policies via the UI portal, updating the external access policies at the central policy storage based on the information, and providing the external access policies that are updated to the plurality of database servers.

In an embodiment of the computer-readable storage medium, one or more of the external access policies include a granular access policy corresponding to at least one of a database server, a database, a database schema, a database table, a column of data, a database object, or a database-related operation.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method comprising:
providing, from a central policy storage to a first database server located remotely from the central policy storage, an external access policy corresponding to access conditions for a user to access resources of the first database server;
providing, to an administrator device, a user interface (UI) portal comprising a policy management options for creation and modification of the external access policy;
receiving, at the central policy storage, information associated with at least one of a policy creation or a policy modification provided via the UI portal for the external access policy;
updating, at the central policy storage, the external access policy based on the received information; and
providing, to the first database server, the updated external access policy to enable the first database server to update the access conditions for the user to access resources of the first database server.

2. The method of claim 1, wherein said providing, to the first database server, the updated external access policy comprises:
pushing the updated external policy to the first database server in response to a periodicity condition being met at the central policy storage.

3. The method of claim 2, wherein the periodicity condition is based on an amount of time that has elapsed since a policy pull request was issued by the first database server.

4. The method of claim 1, wherein the external access policy comprises a granular access policy corresponding to at least one of a database server, a database, a database schema, a database table, a column of data, a database object, or a database-related operation.

5. The method of claim 1, wherein the method further comprises:
provide, to a second database server that shares the centralized policy storage with the first database server, the updated external access policy to enable the second database server to update the access conditions for the user to access resources of the second database server, wherein the user is enabled to perform operations associated with the external access policy on resources of the first database server and the second database server as defined by the scope of the external access policy.

6. The method of claim 1, wherein the updated external access policy comprises security rules represented as a data structure comprising a plurality of nodes, each node in the data structure comprising an expression which can be evaluated to a Boolean value.

7. The method of claim 6, wherein the data structure comprises at least one of a hierarchical data structure, or a tree data structure, and the data structure enables the first database server to allow or deny access to the internal resources of the first database server by recursively iterating over the data structure to determine a Boolean value of a root node of the data structure.

8. A system comprising:
a processor; and
a memory that stores program instructions that, when executed by the processor, cause the processor to:
provide, from a central policy storage to a first database server located remotely from the central policy storage, an external access policy corresponding to access conditions for a user to access resources of the first database server;

provide, to an administrator device, a user interface (UI) portal comprising a policy management options for creation and modification of the external access policy;

receive, at the central policy storage, information associated with at least one of a policy creation or a policy modification provided via the UI portal for the external access policy;

update, at the central policy storage, the external access policy based on the received information; and provide, to the first database server, the updated external access policy to enable the first database server to update the access conditions for the user to access resources of the first database server.

9. The system of claim 8, wherein, to provide the updated external access policy to the first database server, the program instructions, when executed by the processor, cause the processor to push the updated external policy to the first database server in response to a periodicity condition being met at the central policy storage.

10. The system of claim 9, wherein the periodicity condition is based on an amount of time that has elapsed since a policy pull request was issued by the first database server.

11. The system of claim 8, wherein the program instructions, when executed by the processor, cause the processor to:

provide, to a second database server that shares the centralized policy storage with the first database server, the updated external access policy to enable the second database server to update the access conditions for the user to access resources of the second database server, wherein the user is enabled to perform operations associated with the external access policy on resources of the first database server and the second database server as defined by the scope of the external access policy.

12. The system of claim 8, wherein the external access policy comprises a granular access policy corresponding to at least one of a database server, a database, a database schema, a database table, a column of data, a database object, or a database-related operation.

13. The system of claim 8, wherein the updated external access policy comprises security rules represented as a data structure comprising a plurality of nodes, each node in the data structure comprising an expression which can be evaluated to a Boolean value.

14. The system of claim 13, wherein the data structure comprises at least one of a hierarchical data structure, or a tree data structure, and the data structure enables the first database server to allow or deny access to the internal resources of the first database server by recursively iterating over the data structure to determine a Boolean value of a root node of the data structure.

15. A computer-readable storage medium having program instructions recorded thereon that, when executed by a processor, cause the processor to:

provide, from a central policy storage to a first database server located remotely from the central policy storage, an external access policy corresponding to access conditions for a user to access resources of the first database server;

provide, to an administrator device, a user interface (UI) portal comprising a policy management options for creation and modification of the external access policy;

receive, at the central policy storage, information associated with at least one of a policy creation or a policy modification provided via the UI portal for the external access policy;

update, at the central policy storage, the external access policy based on the received information; and provide, to the first database server, the updated external access policy to enable the first database server to update the access conditions for the user to access resources of the first database server.

16. The computer-readable storage medium of claim 15, wherein, to provide the updated external access policy to the first database server, the program instructions, when executed by the processor, cause the processor to push the updated external policy to the first database server in response to a periodicity condition being met at the central policy storage.

17. The computer-readable storage medium of claim 16, wherein the periodicity condition is based on an amount of time that has elapsed since a policy pull request was issued by the first database server.

18. The computer-readable storage medium of claim 15, wherein the program instructions, when executed by the processor, cause the processor to:

provide, to a second database server that shares the centralized policy storage with the first database server, the updated external access policy to enable the second database server to update the access conditions for the user to access resources of the second database server, wherein the user is enabled to perform operations associated with the external access policy on resources of the first database server and the second database server as defined by the scope of the external access policy.

19. The computer-readable storage medium of claim 15, wherein the external access policy comprises a granular access policy corresponding to at least one of a database server, a database, a database schema, a database table, a column of data, a database object, or a database-related operation.

20. The computer-readable storage medium of claim 15, wherein the updated external access policy comprises security rules represented as a data structure comprising a plurality of nodes, each node in the data structure comprising an expression which can be evaluated to a Boolean value, wherein the data structure enables the first database server to allow or deny access to the internal resources of the first database server by recursively iterating over the data structure to determine a Boolean value of a root node.

* * * * *